United States Patent
Haim et al.

(10) Patent No.: US 11,222,114 B2
(45) Date of Patent: Jan. 11, 2022

(54) TIME AND FREQUENCY DOMAIN ANALYSIS OF BYTECODE FOR MALWARE DETECTION

(71) Applicant: International Business Machines Corporation, Armonk, NY (US)

(72) Inventors: Bar Haim, Ashqelon (IL); Eitan Menahem, Be'er Sheva (IL)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 16/051,530

(22) Filed: Aug. 1, 2018

(65) Prior Publication Data

US 2020/0042704 A1    Feb. 6, 2020

(51) Int. Cl.
| | |
|---|---|
| G06F 21/56 | (2013.01) |
| G06K 9/62 | (2006.01) |
| G10L 19/02 | (2013.01) |
| G06N 20/00 | (2019.01) |
| G06F 16/178 | (2019.01) |
| G06K 9/00 | (2006.01) |

(52) U.S. Cl.
CPC ........ *G06F 21/565* (2013.01); *G06F 16/1794* (2019.01); *G06F 21/562* (2013.01); *G06K 9/00523* (2013.01); *G06K 9/6267* (2013.01); *G06N 20/00* (2019.01); *G10L 19/02* (2013.01)

(58) Field of Classification Search
CPC ... G06F 21/565; G06F 16/1794; G06N 20/00; G06N 20/10; G06N 7/005; G06N 3/08; G06N 5/003; G06K 9/6267; G06K 9/00523; G10L 19/02

See application file for complete search history.

(56) References Cited

U.S. PATENT DOCUMENTS

| | | | | |
|---|---|---|---|---|
| 8,776,231 | B2 * | 7/2014 | Moskovitch | G06F 21/562 726/24 |
| 9,665,713 | B2 * | 5/2017 | Avasarala | G06F 21/56 |
| 2003/0065926 | A1 * | 4/2003 | Schultz | H04L 63/145 713/188 |
| 2016/0292418 | A1 * | 10/2016 | Wojnowicz | G06N 3/08 |
| 2016/0335435 | A1 * | 11/2016 | Schmidtler | G06F 21/562 |

(Continued)

FOREIGN PATENT DOCUMENTS

| | | | |
|---|---|---|---|
| CN | 108647518 A | * | 10/2018 |
| WO | WO-2017126786 A1 | | 7/2017 |

OTHER PUBLICATIONS

"Chroma feature", obtained online from <https://en.wikipedia.org/wiki/Chroma_feature>, retrieved on Jul. 5, 2020.*

(Continued)

*Primary Examiner* — Farid Homayounmehr
*Assistant Examiner* — Zhimei Zhu
(74) *Attorney, Agent, or Firm* — Stephen R. Yoder

(57) ABSTRACT

A method, computer program product and computer system are provided. A processor retrieves a target file for inspection of malware. A processor converts the target file to a time domain format. A processor determines one or more time-frequency domain features of the converted target file. A processor generates a malicious classification for the target file based on the one or more time-frequency domain features of the converted target file and one or more classification models.

15 Claims, 6 Drawing Sheets

(56) References Cited

U.S. PATENT DOCUMENTS

| | | | | |
|---|---|---|---|---|
| 2017/0017793 | A1* | 1/2017 | Davis | G06N 3/08 |
| 2018/0007074 | A1* | 1/2018 | Kune | G06F 21/56 |
| 2018/0316693 | A1* | 11/2018 | Zhang | H04W 4/70 |
| 2019/0026466 | A1* | 1/2019 | Krasser | G06F 21/565 |
| 2019/0042743 | A1* | 2/2019 | Chen | G06F 21/563 |
| 2019/0042745 | A1* | 2/2019 | Chen | G06F 21/54 |
| 2020/0045063 | A1* | 2/2020 | Zhang | G06N 3/08 |
| 2020/0218806 | A1* | 7/2020 | Cho | G06K 9/6247 |

OTHER PUBLICATIONS

Clarence Chio, David Freeman, "Machine Learning and Security: Protecting Systems with Data and Algorithms", Nov. 16, 2015, Chapter 4. Malware Analysis.*

IBM Corporation and Microsoft Corporation, "Multimedia Programming Interface and Data Specifications 1.0", Aug. 1991, obtained online from <https://www.aelius.com/njh/wavemetatools/doc/riffmci.pdf>, retrieved on Dec. 21, 2020.*

J. Zico Kolter and Marcus A. Maloof. 2006. Learning to Detect and Classify Malicious Executables in the Wild. J. Mach. Learn. Res. 7 (Dec. 1, 2006), 2721-2744.*

Farrokhmanesh et al., "A Novel Method for Malware Detection Using Audio Signal Processing Techniques", IEEE, © 2016 IEEE, pp. 85-91.

* cited by examiner

TIME AND FREQUENCY DOMAIN ANALYSIS OF BYTECODE FOR MALWARE DETECTION

BACKGROUND OF THE INVENTION

The present invention relates generally to the field of computer security, and more particularly to malware detection.

Malware, or malicious software, are programs or executable code that when executed intend to compromise a computer's security or operation. Malware detection is the practice of inspecting files on a computer to identify malware before the malware can compromise the computer. Antivirus software scan files stored on the computer, inspecting each file for malware. Additionally, some antivirus software provides real-time protection by inspecting downloads and other network traffic to stop malware from being stored on the computer prior to execution.

SUMMARY

Embodiments of the present invention provide a method, system, and program product to classify a target file as being benign or malicious. Embodiments of the invention retrieve a target file for inspection of malware; convert the target file to a time domain format; determine one or more time-frequency domain features of the converted target file; and generate a malicious classification for the target file based, at least in part on, (i) the one or more time-frequency domain features of the converted target file and (ii) one or more classification models.

DETAILED DESCRIPTION

Figure 1:
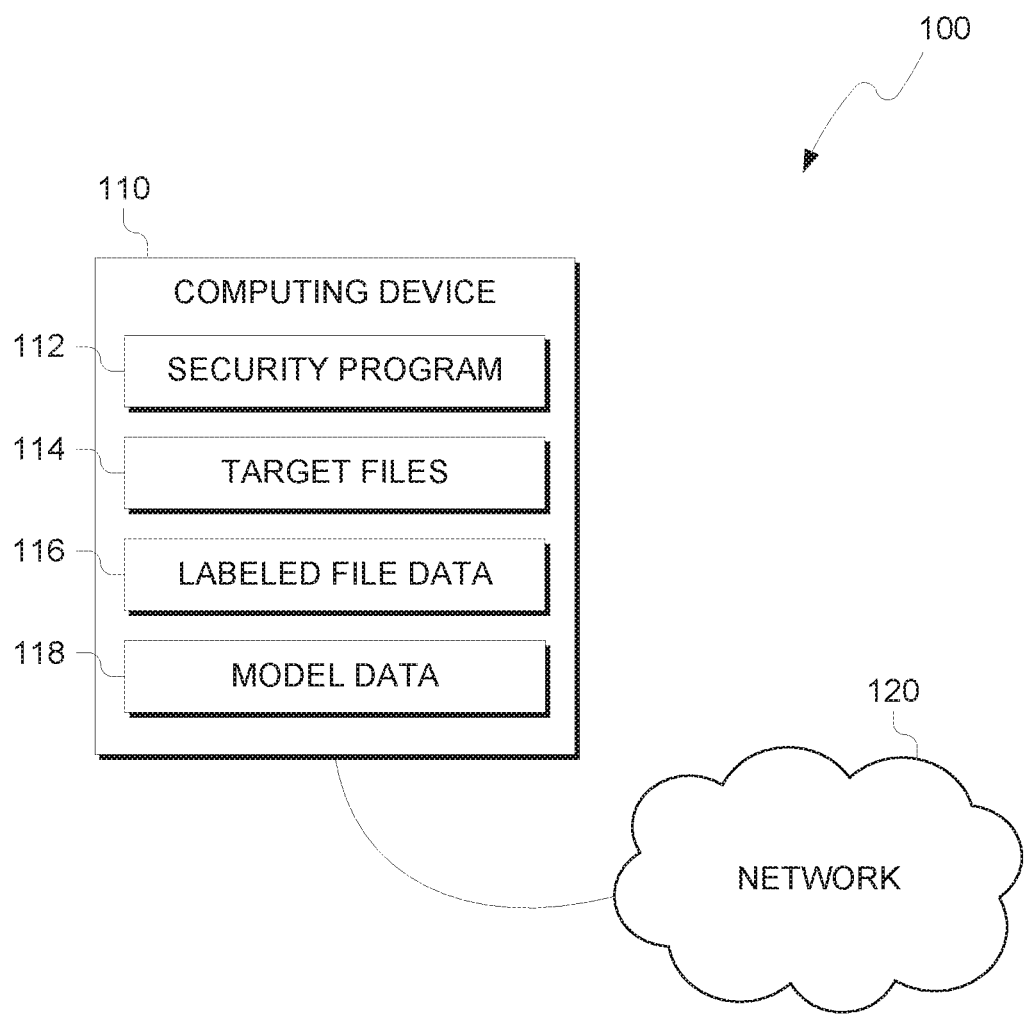
FIG. 1 is a functional block diagram illustrating a networked environment, in accordance with an exemplary embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes computing device 110. Computing device 110 includes security program 112, target files 114, labeled file data 116 and model data 118.

In various embodiments of the present invention, computing device 110 is a computing device that can be a standalone device, a server, a laptop computer, a tablet computer, a netbook computer, a personal computer (PC), or a desktop computer. In another embodiment, Computing device 110 represents a computing system utilizing clustered computers and components to act as a single pool of seamless resources. In general, computing device 110 can be any computing device or a combination of devices with access to target files 114, labeled file data 116 and model data 118 and is capable of executing security program 112. Computing device 110 may include internal and external hardware components, as depicted and described in further detail with respect to FIG. 6.

In this exemplary embodiment, security program 112, target files 114, labeled file data 116 and model data 118 are stored on computing device 110. However, in other embodiments, target security program 112, target files 114, labeled file data 116 and model data 118 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 110 and other devices connected to network 120, in accordance with a desired embodiment of the present invention.

In various embodiments, security program 112 provides malware detection by scanning target files 114 of computing device 110. In some embodiments, security program 112 inspects a file that is stored on computing device 110. In other embodiments, security program 112 receives a file for inspection that is stored or originates from another device (not shown) connected to network 120. One of ordinary skill in the art would recognize that target files 114 may be stored or reside on any device (not shown) connected to network 120 without deviating from the invention.

In various embodiments, target files 114 are any files, executable or otherwise, that can be analyzed and classified as being malware or benign. Benign files are files that have been identified as not containing any malicious code. Malicious files are files that have malicious code within (i) an entirety of the file or (ii) a portion of the file. In some embodiments, security program 112 selects a file in target files 114 for a classification of malware. In other embodiments, security program 112 is provided a target file by either another program (not shown) or a user of security program 112 for a classification of malware.

Figure 2:
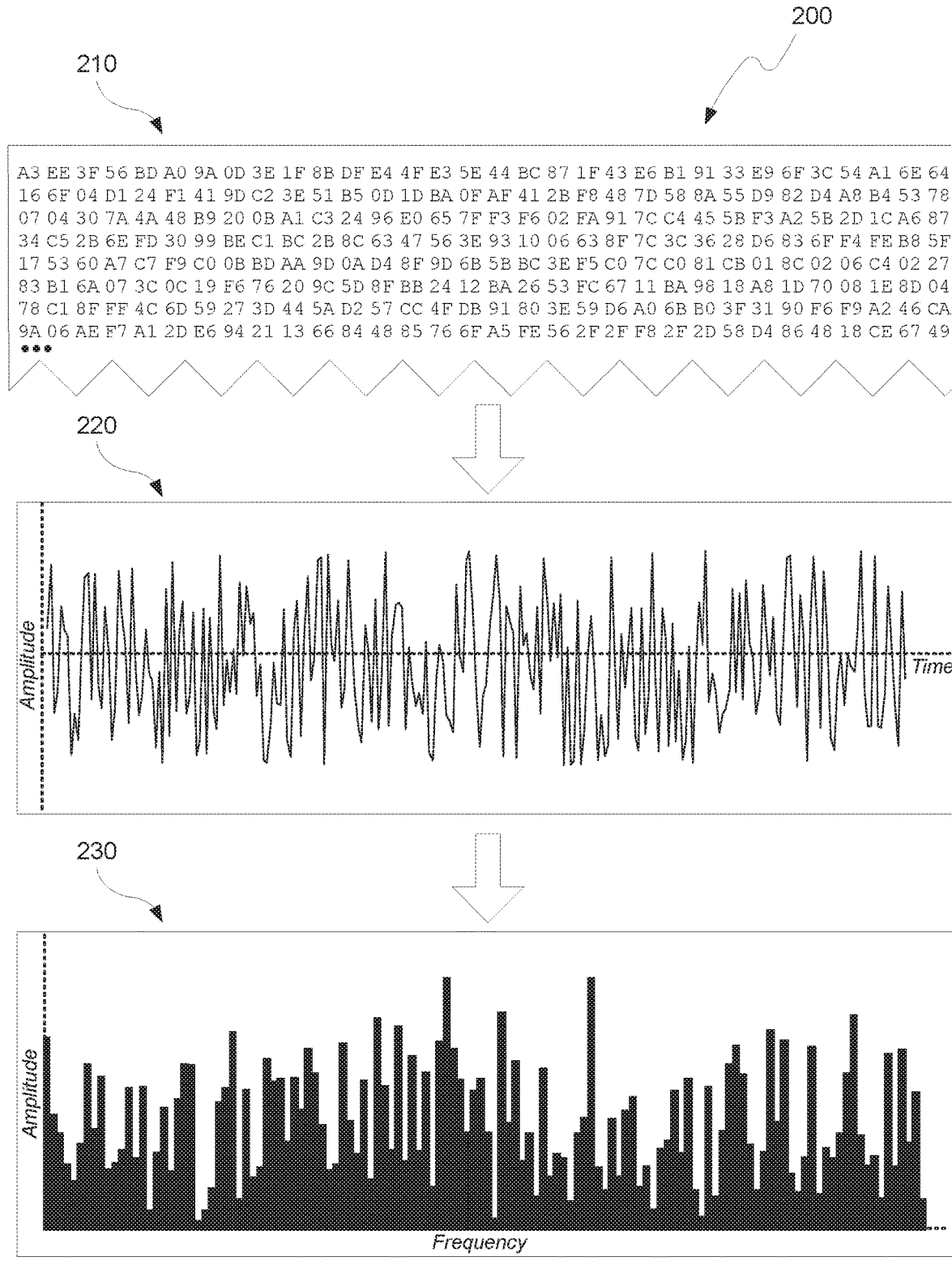
FIG. 2 illustrates a block diagram of converting bytecode of a targeted file to time and frequency domain representations, in accordance with an exemplary embodiment of the present invention.

For a given file of target files 114 that has been selected for malware classification, security program 112 converts the binary or bytecode of the given file into a time-series format. For example, security program 112 (i) reads each byte of an executable file and (ii) uses each read byte as a value in a time series. FIG. 2 depicts a block diagram depicting a conversion 200 of a program's bytecode of a targeted file to time and frequency domain representations. Target file 210 depicts a program's binary file converted into byte values (i.e., "A3 EE 3F . . . "). Security program 112 converts each value to a time domain format 220 where the first byte of target file 210 corresponds to the first value of the time domain format 220, the second byte to the second value and so on (e.g., t=1 is A3, t=2 is EE, t=3 is 3F, etc.).

With the time series of values for target file 210, security program 112 converts time domain format 220 of target file 210 to frequency domain format 230. Frequency domain format 230 includes frequency components or intervals and an amplitude for each component. In some embodiments, converts the time series of time domain format 220 of target file 210 to frequency domain format 230 by utilizing a Fast Fourier Transform (FFT) algorithm. One of ordinary skill in the art will appreciate that any conversion algorithm from time domain format 220 to frequency domain format 230 may be utilized without deviating from the invention such as, but not limited to, Fourier transforms, discrete Fourier transform (DFT), discrete-time Fourier transform (DTFT), Laplace transforms, Z-transforms, or any variant of a FFT.

Based on both the time domain format 220 and frequency domain format 230 for target file 210, security program 112 determines a variety of time and frequency domain features of the time converted target file 210. Example time domain features of time domain format 220 for target file 210 include, but are not limited to, the following: zero crossing rate, signal energy, and entropy of energy. Zero-crossing rate is the rate of sign-changes of the signal from positive to negative or back. Signal energy is a sum of squared values for the times series. Entropy of energy is an energy measurement of the information entropy or Shannon Entropy of the time series. Example frequency domain features of frequency domain format 230 for the time domain format 220 of target file 210 include, but are not limited to, the following: spectral centroid, spectral spread, spectral entropy, spectral flux, and spectral rolloff. Spectral centroid represents the "center of mass" or median frequency in the frequency domain. Spectral spread is the bandwidth or difference between the highest and lowest frequencies in the frequency domain. Spectral entropy is the entropy for normalized spectral energies. Spectral flux is a measurement of change in the spectral energy over time. Spectral rolloff is a distribution of the spectrum that is located within a given percentage of the frequency domain. One of ordinary skill in the art will appreciate that any feature, metric, measurement or information describing the time domain format 220 and frequency domain format 230 for target file 210, may be utilized as discussed herein for classification of malicious and benign files without deviating from the invention.

In various embodiments, security program 112 applies the determined time and frequency domain features of the time converted target file 210 to model data 118 in order to classify the target file 210 as either a benign file or a malicious file. Security program 112 generates model data 118 based on labeled file data 116. Labeled file data 116 includes various files that have been assigned a label indicating that a file in labeled file data 116 is either a malicious file or a benign file. Additionally, security program 112 converts the files in labeled file data to (i) a time domain format and subsequently to (ii) a frequency domain format. For each domain converted file in labeled file data 116, security program 112 determines time and frequency domain features of the labeled file data.

Figure 3:
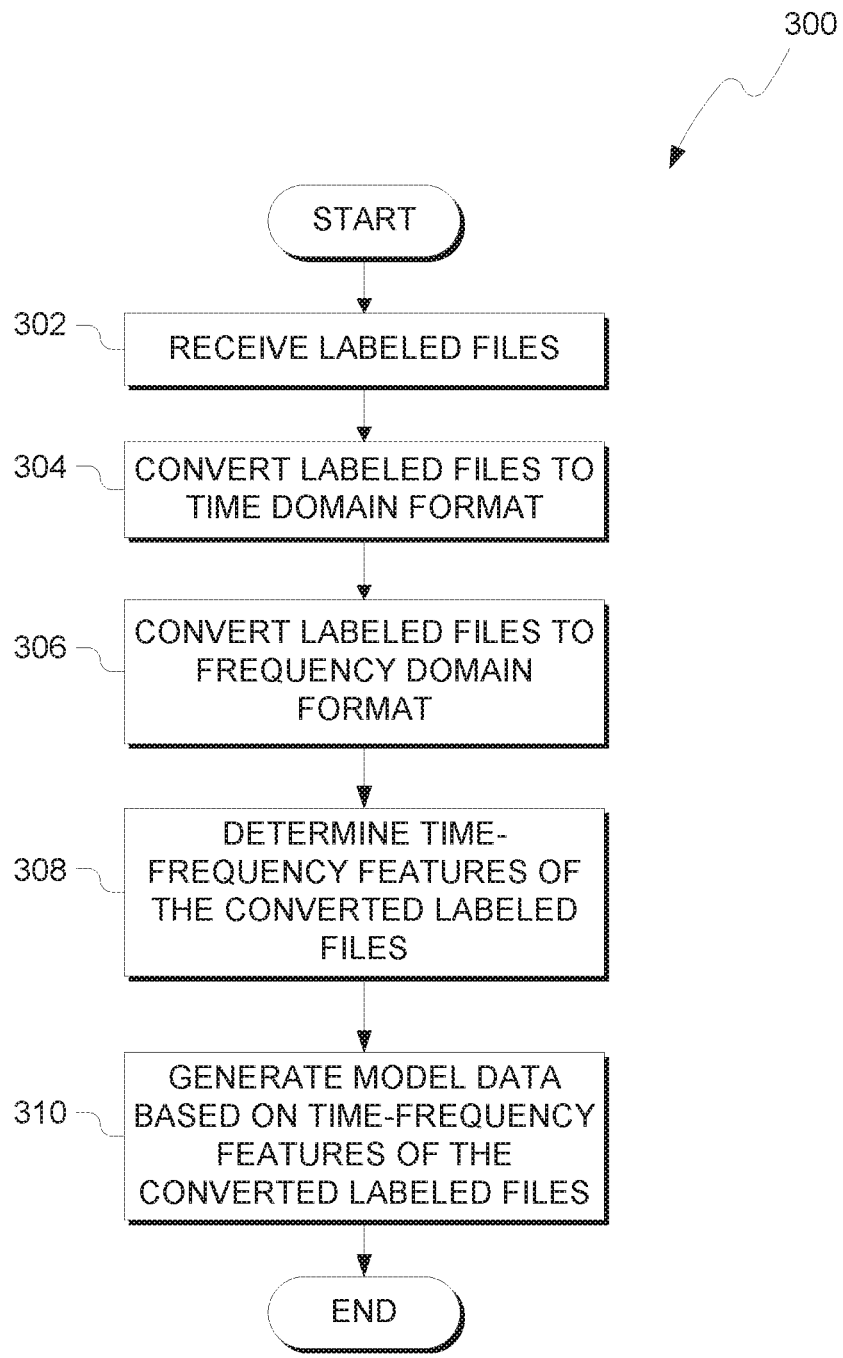
FIG. 3 illustrates operational processes of a security program to generate malware signatures using time and frequency domain metrics, on a computing device within the environment of FIG. 1, in accordance with an exemplary embodiment of the present invention.

FIG. 3 depicts a flowchart, generally depicted 300, of the processes utilized by security program 112 to generate model data 118. In process 302, security program 112 receives one or more labeled files from labeled file data 116 that include the code or information stored in the received files in addition to either a malicious or benign label for the received files. In process 304, security program 112 converts each of the received files in process 302 to a time domain format similar to time domain format 220 of target file 210 discussed in regard to FIG. 2. In process 306, security program 112 converts each of the time domain formatted files in process 304 to a frequency domain format similar to frequency domain format 230 of target file 210 discussed in regard to FIG. 2. Based on both the time domain formats and frequency domain formats for the received labeled file data 116, security program 112 determines one or more time and frequency domain features of the time the received labeled file data 116 (process 308). Example time domain features include, but are not limited to, the following: zero crossing rate, signal energy and entropy of energy. Example frequency domain features include, but are not limited to, the following: spectral centroid, spectral spread, spectral entropy, spectral flux and spectral rolloff.

Based on the label and time-frequency domain features of converted files in labeled file data 116, security program 112 generates model data 118 by utilizing a supervised machine learning algorithm that creates a model utilized to later classify target files 114 (process 310). Supervised machine learning algorithms utilize pre-classified or labeled data to generate prediction models to classify similar types of data. In some embodiments, security program 112 generates one or more decision trees for model data 118. A decision tree is a flowchart-like model comprising decision nodes and end nodes.

Figure 4:
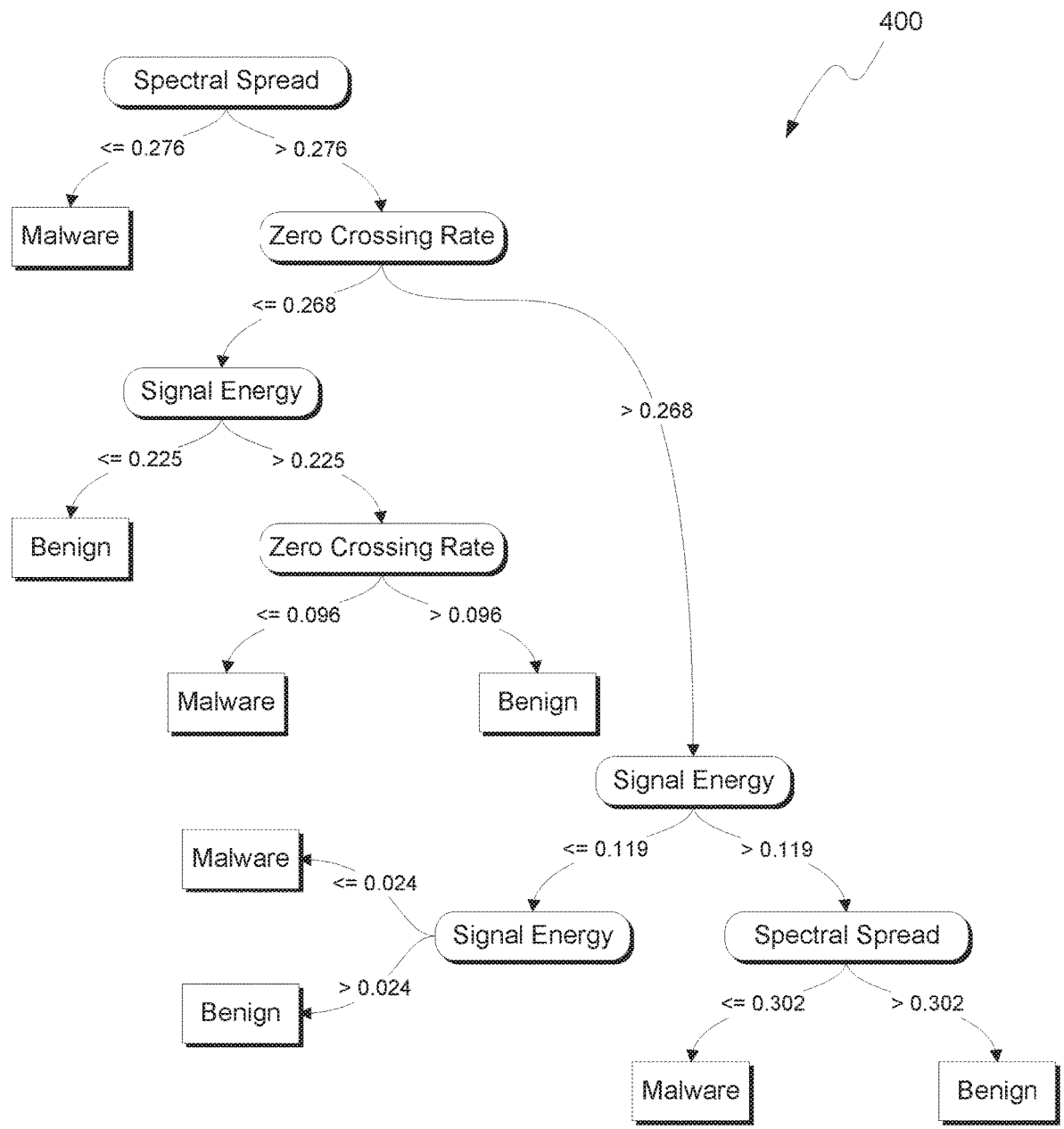
FIG. 4 illustrates a diagram of a classification model generated using time and frequency domain metrics of known malicious files, in accordance with an exemplary embodiment of the present invention.

FIG. 4 illustrates an example classification model 400. In some embodiments or scenarios, classification model 400 is a decision tree. In other embossments or scenarios, classification model 400 includes one or more of the following machine learning classification models: Support Vector Machine (SVM), Bayesian Models, Ensemble Trees, Neural Networks (deep learning), or Nearest Neighbor Clustering. One of ordinary skill in the art will appreciate that any machine learning classification model may be used without deviating from the invention. In scenarios where classification model 400 includes a decision tree, the decision tree includes multiple decision nodes depicted as a rounded rectangles and end nodes depicted as a square rectangles. For some features in either the time domain or frequency domain, security program 112 generates one or more decision nodes in model data 118. The decision nodes of model data evaluate a feature. In the example decision tree, the decision node comprise "less than or equal" decision, where if a give feature is (i) less than or equal to a value, then a particular branch or path is taken, or (ii) if the value is greater, then another branch is taken. One of ordinary skill in the art would appreciate that any type of decision may be used in model data 118 without deviating from the invention. In this example, the extracted features of "Spectral Spread", "Zero Crossing Rate" and "Signal Energy" are present in model data 118. The end nodes provide the classifications of targets. In the example decision tree, two classifications are determined, whether a target file is benign or malicious. As the features of a target are evaluated by the decision nodes of the decision trees, when an end node is reach security program 112 classifies the target file accordingly (i.e., if the end node is indicated as "benign" then the file is classified as benign or if the end node is indicated as "malicious" then the file is classified as malicious).

Referring back to process 310 of FIG. 3, security program 112 utilizes labeled file data 116 to enter a training in order to generate a decision tree for model data 118. For each file in labeled file data 116, security program updates the decision tree of model data 118. In some embodiments, operational processes 300 of FIG. 3 are performed with multiple labeled files in a batch. In other embodiments, operational processes 300 of FIG. 3 are performed a single labeled file at a time. For each file or batch of files, security program updates model data 118 by adding/removing decision or end nodes, changing paths or branches connecting decision or end nodes, or changing the values or decisions for decision nodes. After multiple generations and a large enough sample size is provided, security program 112 identifies that the decision tree has been properly trained and is available for classification of target files 114.

In some embodiments, security program 112 routinely performs the operational processes 300 of FIG. 3 to re-train or update the decision tree of model data 118. One of ordinary skill in the art will appreciate that any machine learning algorithm may be utilized to generate model data without deviating from the invention. For example, unsupervised, such as clustering models, or semi-supervised, such as neural networks, machine learning algorithms may be utilized with the extracted time and frequency domain features of various file data in order to generate classification models without deviating from the from the invention.

Figure 5:
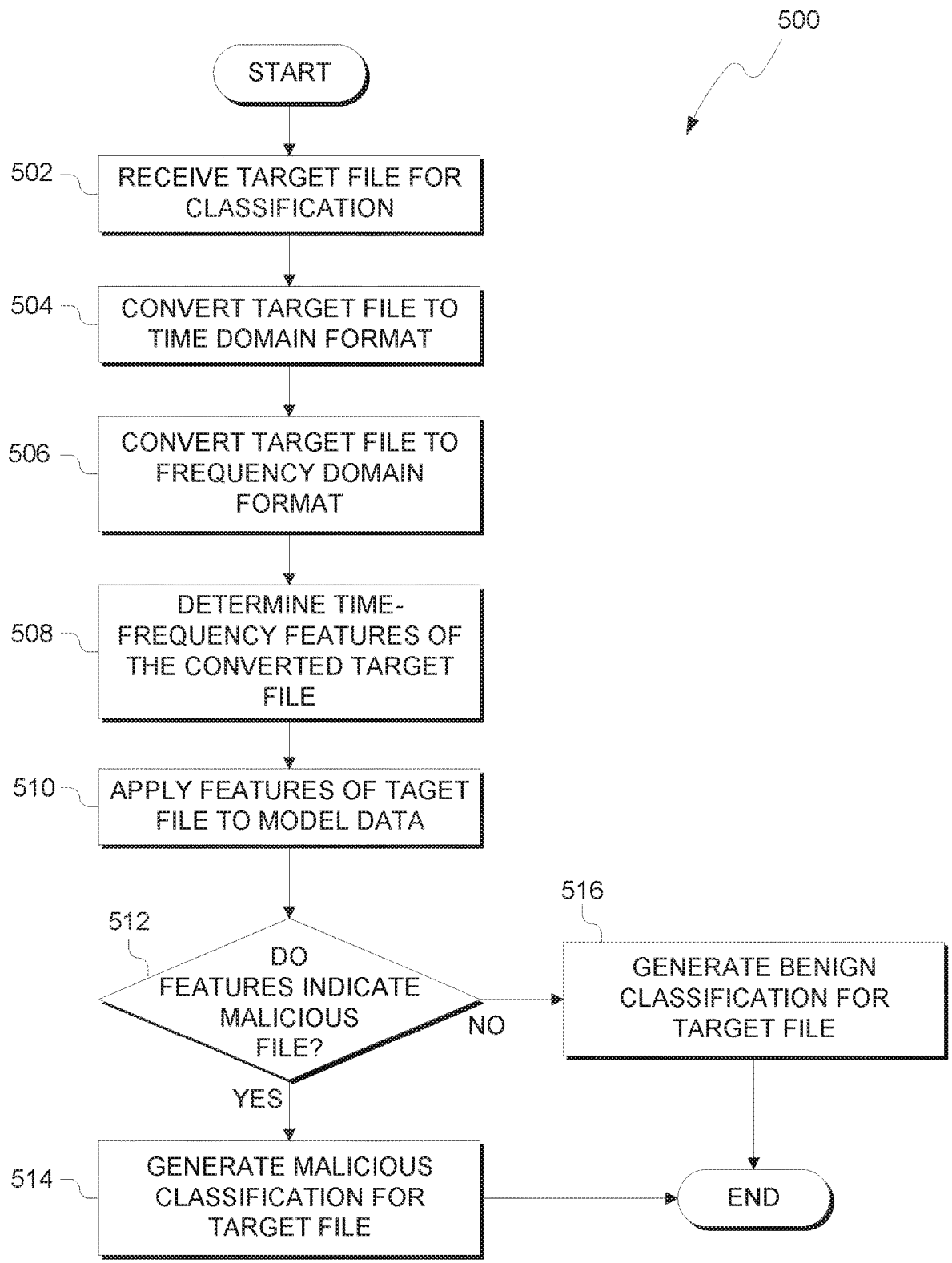
FIG. 5 illustrates operational processes of a security program to detect potential malware using time and frequency domain metrics of known malicious files, on a computing device within the environment of FIG. 1, in accordance with an exemplary embodiment of the present invention.

FIG. 5 depicts a flowchart of the operational process of security program 112, generally designated 500, utilized to classify a target file as malicious or benign. In process 502, security program 112 receives a target file from target files 114 for classification as either being benign or malicious. In some embodiments, security program 112 receives input from a user to classify, evaluate, or scan a target file. In other embodiments, security program 112 actively scans files in target files 114 for classification. In some embodiments, target files 114 are stored on the same device executing security program 112 (i.e., computing device 110). In other embodiments, target files 114 are stored on another device (not shown) communicatively coupled to computing device 110.

In process 504, security program 112 converts the target file to a time domain format. Referring back to FIG. 2, the bytecode or values of the target file are converted to a time series representation (time domain format 220). In various embodiments, time domain format 220 of a file is a series or array of values where the position in the target file corresponds to a time value in the series (e.g., looking at FIG. 2 and target file 210 and time domain format 220, t=1 is A3, t=2 is EE, t=3 is 3F, etc.). Arranging the byte values in such a format permits the treatment and analysis of the file as a time domain signal, which permits the discussed time and frequency domain features to be extracted and used for classification.

In some embodiments, security program 112 converts the target file 210 to a specific file contained format to increase processing efficiency of the target file. In such embodiments, security program 112 converts the target file to a lossless audio file format. Such an implementation has many benefits. For example, many Fast Fourier algorithms are designed to specifically convert audio files into a frequency domain, which benefits in the next process 506. An example, lossless audio format file is a waveform audio file of .WAV file. WAV files consists of a header portion and a data portion. The data portion can be configured to be uncompressed byte-wide samples, which correspond to the byte values of an executable file. Such executable files are common target by anti-virus and other computer security programs. Therefore, the WAV. file container can be quickly created and utilized for FFT or other frequency domain audio file algorithms with minimal processing time. Since most known computer security programs need to perform scans and classifications on numerous files, embodiments of the present invention provide improvements to the timely detection of malicious software and decrease processing time and turnaround for classifying and responding to potential malicious files by a computing device when compared to prior solutions. One of ordinary skill in the art will appreciate that (i)) detection of malicious software is required in order to initiate a solution to address that particular malicious software and (ii) that the longer a malicious software is permitted to run, the greater the risk that malicious software presents. One of ordinary skill in the art will appreciate that any type of file container or lossless audio container may be used without deviating from the invention such as, but not limited to Free Lossless Audio Codec (FLAC), Audio Interchange File Format (AIFF), Resource Interchange File Format (RIFF) or the like. Additionally, one of ordinary skill in the art will appreciate that any sample width (e.g., 8 bit, 16 bit, 24 bit, etc.) and sample rate (e.g., 22 kHz, 44 kHz, etc.) may be used in converting the target file to an audio file without deviating from the invention.

In process 506, security program 112 converts the time domain format 220 of the target file 210 to a frequency domain format 230. In some embodiments, converts the time series of time domain format 220 of target file 210 to frequency domain format 230 by utilizing a Fast Fourier Transform (FFT) algorithm. In process 508, security program 112 determines one or more features of the target file 210 regarding the time domain format 220 and frequency domain format 230 of the file. In some embodiments, security program 112 includes other features not associated with the time or frequency domain features of a converted target file. For example, security program 112 may include metadata associated with the target file 210 such as header information, location or path, usage patterns, or any other information describing the target file 210. In such embodiments, security program 112 includes the additional features in the training of model data 118 to incorporate the features in the machine learning algorithm discussed regarding FIG. 3.

In process 510, security program 112 applies the features determined in process 508 to model data 118. In decision process 512, security program 112 determines if the features of the target file in the time and frequency domain, and in some embodiments metadata regarding the target file, indicate if the file is malicious. If the features determined in process 508 when applied model data 118 indicate the file is benign (NO branch of process 512), then security program 112 generates a "benign" classification for the target file (process 516). If the features determined in process 508 when applied model data 118 indicate the file is malicious (YES branch of process 512), then security program 112 generates a "malicious" classification for the target file (process 514). In some embodiments, security program 112 keeps a record of the determined classifications for target files 114. In some scenarios, security program 112 re-scans "benign" files after some pre-determined time has passed. For files with the "malicious" classification, security program 112 sends a warning message regarding the file and the potential maliciousness of the file. In some scenarios, security program 112 quarantines, deletes, or otherwise isolates the target file from access to resources of computing device 110 or other devices (not shown) connected to network 120.

In embodiments where model data 118 includes a decision tree, such as the decision tree illustrated and discussed in relation to FIG. 4, security program 112 (i) starts at the first decision node of the decision tree, (ii) evaluates the relevant decision, and (iii) traverses the decision tree until an end node is found (process 512). Security program 112 bases decision process 512 on the end node that is identified based on the values of the features determined in process 508. For end nodes that indicate a "benign" classification for the target file, security program 112 generates a "benign" classification for the target file (process 516). For end nodes that indicate a "malicious" classification for the target file, security program 112 generates a "malicious" classification for the target file (process 514). In some embodiments and scenarios, when security program 112 classifies the target file as malicious, security program 112 sends a warning message or other indicative information to a user or another program indicating the classification of a file. For malicious files, security program 112 quarantines or isolates the malicious file from access to various computing resources of computing device 110. In some embodiments, security program 112 updates labeled file data 116 with files classified as either malicious or benign for later analysis to update model data 118 as discussed in regard to FIG. 3.

Figure 6:
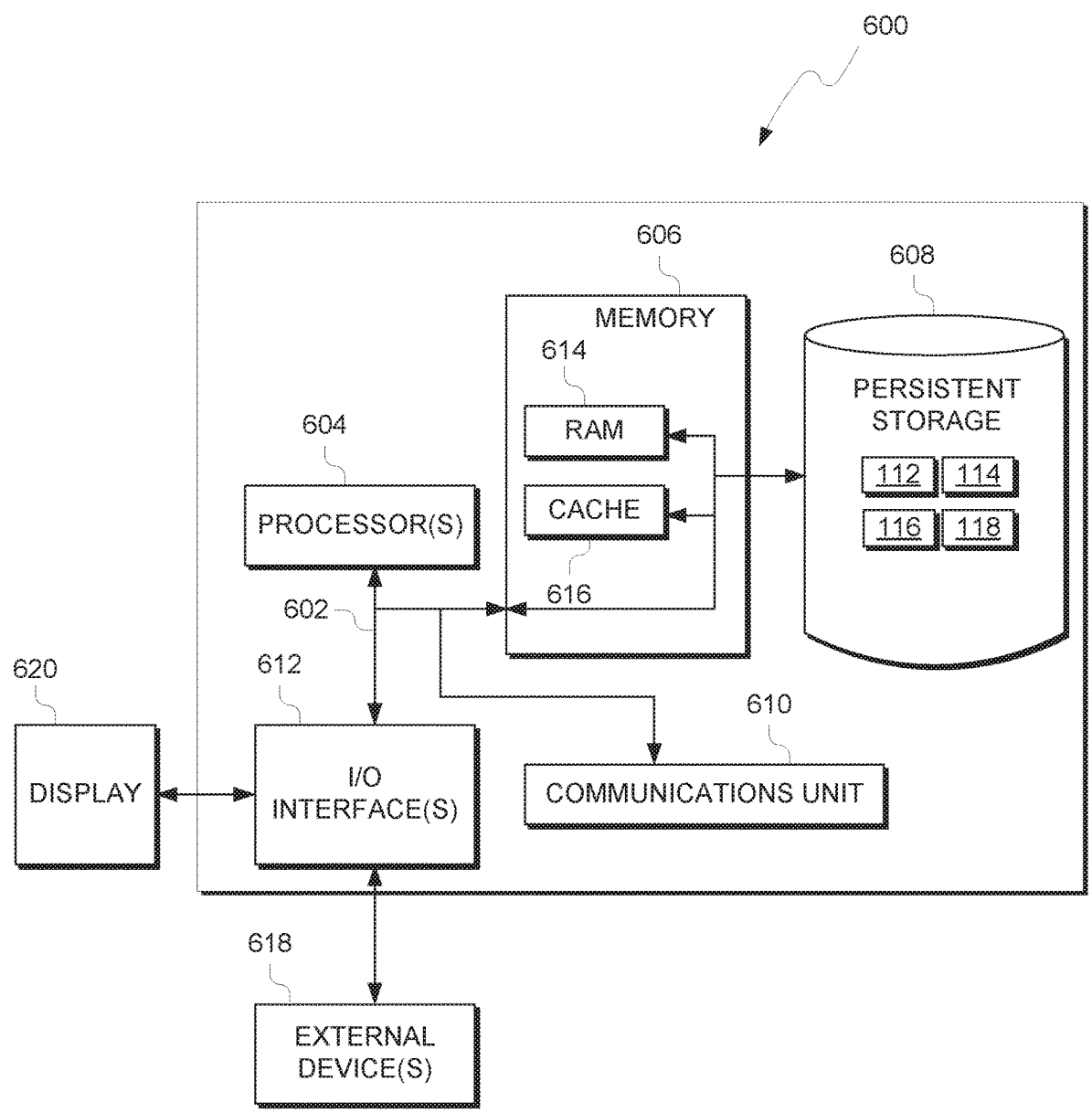
FIG. 6 depicts a block diagram of components of the computing device executing a security program, in accordance with an exemplary embodiment of the present invention.

FIG. 6 depicts a block diagram, 600, of components of computing device 110, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 110 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Security program 112, Target files 114, labeled file data 116 and model data 118 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 120. In these examples, communications unit 610 includes one or more network interface cards. Communications unit 610 may provide communications through the use of either or both physical and wireless communications links. Security program 112, target files 114, labeled file data 116 and model data 118 may be downloaded to persistent storage 608 through communications unit 610.

I/O interface(s) 612 allows for input and output of data with other devices that may be connected to computing device 110. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., security program 112, target files 114, labeled file data 116 and model data 118, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method, comprising:
   retrieving, by one or more processors, a target file for inspection of malware;
   converting, by the one or more processors, the target file to a time domain format, wherein (i) the converted target file is a lossless audio file and (ii) each value of the time domain format of the target file corresponds to a byte in the target file;
   determining, by the one or more processors, one or more time-frequency domain features of the converted target file; and
   generating, by the one or more processors, a malicious classification for the target file based, at least in part on, (i) the one or more time-frequency domain features of the converted target file and (ii) one or more decision tree classification models, wherein the one or more decision tree classification models includes at least one decision node associated with the one or more time-frequency domain features of the converted target file.

2. The method of claim 1, wherein the method further comprises:
   receiving, by the one or more processors, a plurality of labeled files, wherein (a) at least one of the plurality of labeled files includes a benign label and (b) at least one the plurality of labeled files includes a malicious label;
   converting, by the one or more processors, the plurality of labeled files to a time domain format;
   determining, by the one or more processors, one or more time-frequency domain features of the converted plurality of labeled files; and
   generating, by the one or more processors, the one or more decision tree classification models based, at least in part on, (i) the one or more time-frequency domain features of the converted plurality of labeled files and (ii) the one or more labels indicating classifications of the plurality of labeled files.

3. The method of claim 2, wherein generating a malicious classification for the target file further comprises:
classifying, by the one or more processors, the target file based, at least in part on, (i) the one or more time-frequency domain features of the converted target file and (ii) the one or more decision tree classification models.

4. The method of claim 1, wherein the time-frequency domain features include at least one of the following time domain features: (i) zero crossing rate, (ii) signal energy or (iii) entropy of energy.

5. The method of claim 1, wherein the time-frequency domain features include at least one of the following frequency domain features: (i) spectral centroid, (ii) spectral spread, (iii) spectral entropy, (iv) spectral flux or (v) spectral rolloff.

6. A computer program product, comprising:
one or more computer-readable storage media and program instructions stored on the one or more computer-readable storage media, the program instructions comprising:
program instructions to retrieve a target file for inspection of malware;
program instructions to convert the target file to a time domain format, wherein (i) the converted target file is a lossless audio file and (ii) each value of the time domain format of the target file corresponds to a byte in the target file;
program instructions to determine one or more time-frequency domain features of the converted target file; and
program instructions to generate a malicious classification for the target file based, at least in part on, (i) the one or more time-frequency domain features of the converted target file and (ii) one or more decision tree classification models, wherein the one or more decision tree classification models includes at least one decision node associated with the one or more time-frequency domain features of the converted target file.

7. The computer program product of claim 6, wherein the method further comprises:
program instructions to receive a plurality of labeled files, wherein (a) at least one of the plurality of labeled files includes a benign label and (b) at least one the plurality of labeled files includes a malicious label;
program instructions to convert the plurality of labeled files to a time domain format;
program instructions to determine one or more time-frequency domain features of the converted plurality of labeled files; and
program instructions to generate the one or more decision tree classification models based, at least in part on, (i) the one or more time-frequency domain features of the converted plurality of labeled files and (ii) the one or more labels indicating classifications of the plurality of labeled files.

8. The computer program product of claim 7, wherein generating a malicious classification for the target file further comprises:
program instructions to classify the target file based, at least in part on, (i) the one or more time-frequency domain features of the converted target file and (ii) the one or more decision tree classification models.

9. The computer program product of claim 6, wherein the time-frequency domain features include at least one of the following time domain features: (i) zero crossing rate, (ii) signal energy or (iii) entropy of energy.

10. The computer program product of claim 6, wherein the time-frequency domain features include at least one of the following frequency domain features: (i) spectral centroid, (ii) spectral spread, (iii) spectral entropy, (iv) spectral flux or (v) spectral rolloff.

11. A computer system, comprising:
one or more computer processors;
one or more computer readable storage media; and
program instructions stored on the computer readable storage media for execution by at least one of the one or more processors, the program instructions comprising:
program instructions to retrieve a target file for inspection of malware;
program instructions to convert the target file to a time domain format, wherein (i) the converted target file is a lossless audio file and (ii) each value of the time domain format of the target file corresponds to a byte in the target file;
program instructions to determine one or more time-frequency domain features of the converted target file; and
program instructions to generate a malicious classification for the target file based, at least in part on, (i) the one or more time-frequency domain features of the converted target file and (ii) one or more decision tree classification models, wherein the one or more decision tree classification models includes at least one decision node associated with the one or more time-frequency domain features of the converted target file.

12. The computer system of claim 11, wherein the method further comprises:
program instructions to receive a plurality of labeled files, wherein (a) at least one of the plurality of labeled files includes a benign label and (b) at least one the plurality of labeled files includes a malicious label;
program instructions to convert the plurality of labeled files to a time domain format;
program instructions to determine one or more time-frequency domain features of the converted plurality of labeled files; and
program instructions to generate the one or more decision tree classification models based, at least in part on, (i) the one or more time-frequency domain features of the converted plurality of labeled files and (ii) the one or more labels indicating classifications of the plurality of labeled files.

13. The computer system of claim 12, wherein generating a malicious classification for the target file further comprises:
program instructions to classify the target file based, at least in part on, (i) the one or more time-frequency domain features of the converted target file and (ii) the one or more decision tree classification models.

14. The computer system of claim 11, wherein the time-frequency domain features include at least one of the following time domain features: (i) zero crossing rate, (ii) signal energy or (iii) entropy of energy.

15. The computer system of claim 11, wherein the time-frequency domain features include at least one of the following frequency domain features: (i) spectral centroid, (ii) spectral spread, (iii) spectral entropy, (iv) spectral flux or (v) spectral rolloff.

* * * * *